United States Patent
Srinivasan et al.

(10) Patent No.: US 11,194,673 B2
(45) Date of Patent: Dec. 7, 2021

(54) SYSTEM AND METHOD TO ENABLE FILE LEVEL RECOVERY OF VIRTUAL DISKS AND DYNAMIC DISKS

(71) Applicant: EMC IP Holding Company LLC, Hopkinton, MA (US)

(72) Inventors: Sharath Talkad Srinivasan, Bengaluru (IN); Smitha Prakash Kalburgi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

(21) Appl. No.: 16/713,480

(22) Filed: Dec. 13, 2019

(65) Prior Publication Data
US 2021/0182159 A1    Jun. 17, 2021

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 2009/45591* (2013.01); *G06F 2201/84* (2013.01)

(58) Field of Classification Search
CPC ............. G06F 11/1469; G06F 11/1446; G06F 11/1448; G06F 11/1458; G06F 11/2007; G06F 11/2028; G06F 11/2033; G06F 11/203; G06F 11/2023; G06F 9/45558; G06F 2009/45591; G06F 2201/84
See application file for complete search history.

(56) References Cited

U.S. PATENT DOCUMENTS

| | | | |
|---|---|---|---|
| 2010/0070725 A1* | 3/2010 | Prahlad | G06F 11/1453 711/162 |
| 2018/0373597 A1* | 12/2018 | Rana | G06F 16/907 |
| 2019/0087108 A1* | 3/2019 | Bhagi | G06F 11/3034 |
| 2020/0241907 A1* | 7/2020 | Dornemann | G06F 11/2094 |

\* cited by examiner

*Primary Examiner* — Matthew M Kim
*Assistant Examiner* — Kurosu Risa Altaf
(74) *Attorney, Agent, or Firm* — Staniford Tomita LLP (57) ABSTRACT

Embodiments are described for enabling file level recovery (FLR) process for dynamic disks in a data storage system. A source virtual machine (VM) stores data files after a data backup operation and to be restored to a destination VM using the FLR operations; a copy of the source VM is spawned and has an Instant Recover (IR) execution component performing IR operations. A helper VM is spawned using the IR operation of the source VM copy. A FLR agent installed on each of the source VM copy and the destination VM is configured to identify a disk on the source VM as being a dynamic disk, and to allow the helper VM to act as a file transfer facilitator between the source VM and the destination VM. In this way, dynamic disks on the source VM are distinguished from regular disks even when they has the same UUID.

20 Claims, 9 Drawing Sheets

SYSTEM AND METHOD TO ENABLE FILE LEVEL RECOVERY OF VIRTUAL DISKS AND DYNAMIC DISKS

CROSS-REFERENCE TO RELATED APPLICATIONS

This application is related to co-pending application Ser. No. 16/713,447, entitled "System and Method to Enable File Level Recovery of Virtual Disks and Dynamic Disks," filed on Dec. 13, 2019, which is hereby incorporated by reference its entirety.

TECHNICAL FIELD

Embodiments are generally directed to enabling file level recovery of virtual hard disks and dynamic disks.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. The advent of virtualization technology has led to the increased use of virtual machines as data storage targets. Virtual machine (VM) backup and disaster recovery systems using hypervisor platforms, such as vSphere from VMware or Hyper-V from Microsoft, among others, have been developed to provide recovery for various different needs, such as data migration, disaster recovery, regular scheduled backups (hourly, daily, etc.), and so on.

Popular backup platforms (e.g., EMC Networker) support backups, such as block based backups (BBB) of volumes and files in a virtual hard disk (VHD or VHDx) format. The files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. A VHD is a file format that represents a virtual hard disk drive (HDD). It may contain what is found on a physical HDD, such as disk partitions and a file system, which in turn can contain files and folders.

Another type of disk abstraction are dynamic disks, such as iSCSI disks, which use an IP based networking standard for linking data storage facilities. Dynamic disks provide more flexibility than basic disks because they do not use a partition table to keep track of disk partitions. Instead, they use a hidden logical disk manager (LDM) or a virtual disk service (VDS) to track information about the dynamic partitions or volumes on the disk. This allows the creation of partitions that span across many disks, such as spanned or striped volumes.

For large-scale networks, the amount of data can be enormous and management of backup media and files is necessary to ensure timely recovery. Existing file level recovery option can recover files from only one backup at a time. If the user is not sure about the location of a particular backup file, it becomes a tedious and time consuming job to browse through all the backup one-by-one in a serial fashion. The problem can become unmanageable if the backup system runs daily backups and thus creates a lot of confusing restore points. Current backup systems use a file level restore (FLR) agent to browse the backups and present the contents to the user. In general, FLR provides a way to access individual files within a restore point, and makes it possible to read copies of files or restore them from within restore points to any other available location.

Present systems do not support file level restore processes on either dynamic or VHD disks. With respect to VHD disks, the issue is that a VHD disk format is memory-mapped and each time a VM is powered, this memory mapping is lost. Hence, upon mounting, FLR agents cannot detect the existence of VHD disks, as these disks will not be mapped. With respect to dynamic disks, file level restoration is not supported because an iSCSI disk and an original disk on the server will have the same UUID (universally unique identifier). This means that when performing file level restores of a VM using an iSCSI disk, the disk cannot be brought online or it is otherwise marked as invalid.

What is needed, therefore, is a file level restore or file level recovery method that works with both dynamic and VHD disks.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
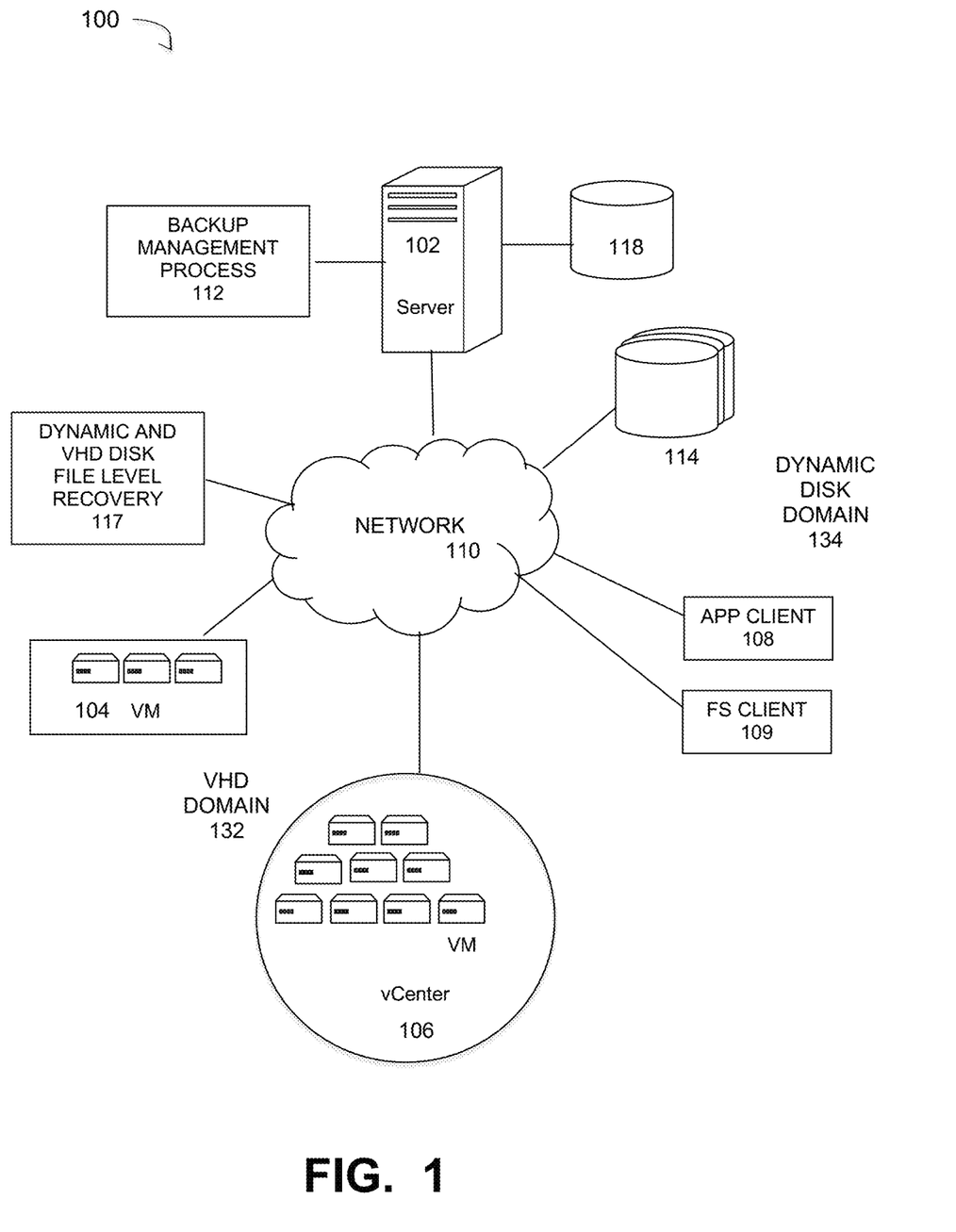
FIG. 1 is a diagram of a large-scale network implementing a file level restore process for both dynamic and VHD disks, under some embodiments.

FIG. 1 illustrates a computer network system 100 that implements one or more embodiments of a file level recovery process for both dynamic and VHD disks. System 100 represents a network backup system that can backup data to one or more different storage media domains, such as a VHD disk domain 132 and a dynamic disk domain 134. It should be noted that for purposes of description, the terms "file level recovery" and "file level restore" may be used interchangeably, and may be expressed by the acronym "FLR." FLR operations are used when a user wants to restore a version of a single file that was backed up after a data recovery. Instead of restoring an entire previous version of the VM that contained the file, or rolling back to previous versions (which may overwrite the existing VM), FLR provides a way to access individual files within restore points for VMs, thus making it possible to read/restore copies of files from with restore points to any other location When a restore point is mounted, a root mount point is created on the VM local disk. The root mount point contains a directory for each mounted disk associated with that restore point. A user can browse the contents of the VMDK disk files for the restore point for the virtual machine. Any files on the disk files for the selected restore point can then be copied to a specific location. After an FLR operation, a user can choose to unmount restore points.

For the VHD domain 132, a number of VMs or groups of VMs are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as application clients 108 or file system (FS) clients 109. Other data sources having data to be protected and backed up may include other VMs 104 and data in network storage 114. The data sourced by the data source may be any appropriate type of data, such as database data that is part of a database management system. In this case, the data may reside on one or more hard drives 114, and may be stored in the database in a variety of formats. One example is an Extensible Markup Language (XML) database, which is a data persistence software system that allows data to be stored in XML format. Another example is a relational database management system (RDMS) which uses tables to store the information. Application client 108 may represent a database component that instantiates a program that interacts with the database. Each instance of a database component may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 106, and to the data sources 108 and 109 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

Besides the VM based VHD storage domain 132, the data generated or sourced by system 100 may be stored in any number of other storage locations and devices, such as local client storage, server storage (e.g., 118), or network storage (e.g., 114), which may at least be partially implemented through storage device arrays, such as RAID components. In an embodiment, network storage 114 and even server storage 118 may be embodied as iSCSI (or similar) disks that provide dynamic disk storage. Other types of storage architectures may also be used, such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (Open-Storage) devices.

For the embodiment of FIG. 1, network system 100 includes a server 102 that executes a backup management process 112 automates the backup of network data using the target VM devices or the dynamic disks 114. In an embodiment, the process 112 uses certain known full and incremental (or differencing) backup techniques along with a snapshot backup process that is used to store an image or images of the system(s) to be backed up prior to the full or incremental backup operations. In an embodiment, system 100 may represent a Data Domain Restorer (DDR)-based deduplication storage system, and storage server 128 may be implemented as a DDR. Deduplication Storage server provided by EMC Corporation. However, other similar backup and storage systems are also possible.

For the embodiment of FIG. 1, system 100 includes a file level recovery process 117 for dynamic and VHD disks. This process enables the system to detect/discover the existence of a VHD and dynamic disks in the backup copy and then make the files in the VHD and dynamic disks available for file level recovery. With respect to VHD disks, process 117 facilitates file level recovery of files present in the VHD disks by using the destination VM's memory to read the VHD disks. With respect to dynamic disks, process 117 facilitates file level recovery on dynamic disks by a handshaking mechanism of mounting and unmounting simple disks.

In an embodiment, system 100 illustrates a large-scale network implementing a file level recovery process using virtual machines in a Data Domain, or similar enterprise backup system. The dynamic and VHD disk file level recovery process 117 is executed as part of a VM 104 or vCenter 106. In an embodiment, the recovery process is initiated from the backup server 102. The networker server acts as an orchestrator for the entire data recovery workflow. Once the mount operation is completed successfully, the user is notified through an appropriate user interface (UI). Then user logs in to the target VM and does a search on the attached file system and copies the required files to the target VM.

Embodiments of the file level recovery process 117 make use of certain technologies, such as NFS (network file system) data store mount on ESXi, Instant Recover (IR) technology in EMC Networker products, where the backup data in Data Domain is exported as an NFS file share, and FLR mount operations. Data may be stored using the VMDK (Virtual Machine Disk) file format that describes containers for virtual hard disk drives used in the VMs. In general, NFS is a client/server application that allows a user to view and store/update files on a remote computer as though on a local computer.

Figure 2:
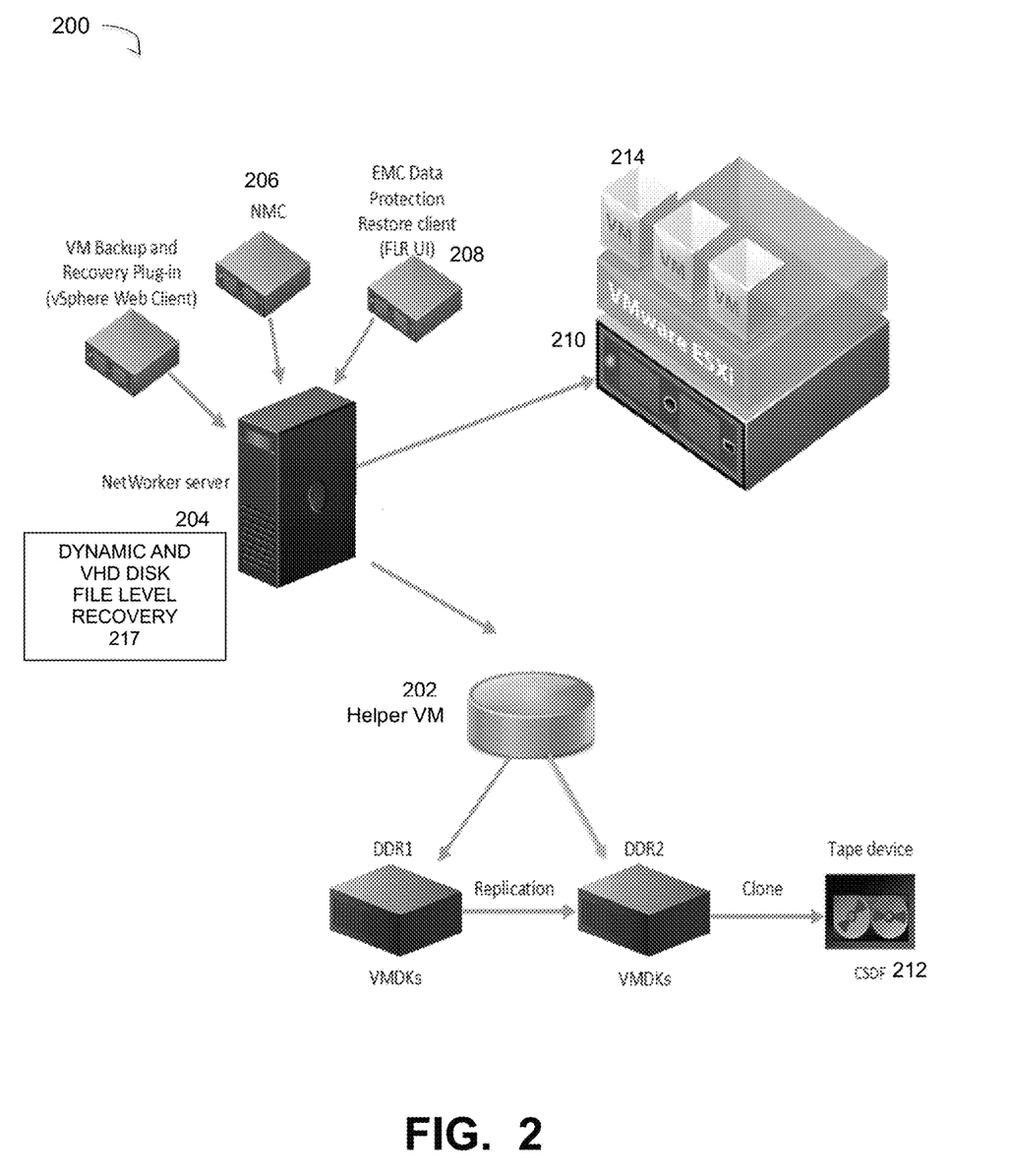
FIG. 2 illustrates an overall WA protection system executing a dynamic and VHD file level restore process, under some embodiments.

FIG. 2 illustrates an overall VM protection system executing a dynamic and VHD file-level restore process, under some embodiments. The example system shown in FIG. 2 is based on a VMware and DellEMC Networker system, but other embodiments are also possible. For system 200 of FIG. 2, a dynamic and VHD file level recovery process 217 is provided as an internal process, such as in server 204 to facilitate data movement between source and target VMs, and a VMware, or similar host 210 and the target protection storage (e.g., Data Domain) DDRs, as will be described in greater detail below. A helper VM 202 may also be provided for use by the FLR process 217, as described in greater detail with respect to FIG. 3 below. The NetWorker server 204 provides the ability to configure data protection policies for backup and clone operations. It integrates with the FLR process 217 to provide centralized management in a virtual environment. The NMC server 206 provides the ability to start, stop, and monitor data protection policies and perform recovery operations. The EMC Data Protection Restore client UI 208 provides the ability to perform file level recovery by using a web interface for the user. The DDR1 and DDR2 Data Domain appliances receive and clone backup data in SSDF (solid state disk format), and tape device 212 is the storage media that receives backup data in CDSF (CD file system) format, in an example implementation. In an embodiment, server 210 runs the VMware ESXi process that maintains and controls the virtual machines 214.

In an embodiment, the file level recovery process is initiated by the backup server 204. Appropriate disk mounts (in which all the processes run) sources the source VM disk to the target VM. After the mount operations are completed, the required files are copied from the base VM to the source VM via the network. In an embodiment the DDR1 and DDR2 appliances in system 100 are VMDK disks, which are containers for virtual hard disk drives for virtual machine file images used natively in a VMware system. In an example implementation, the FLR operation processes data from one VM (the source) to another VM (destination), so that there is one mount point on the destination VM with multiple VMDK's exposed as a file system.

File Level Recovery for VHD Disk Storage

As stated previously, present systems do not support FLR on VHD disk format, meaning that any files present in the VHD disks during backup cannot be recovered using FLR operations. This is because the VHD disk formats are memory mapped and each time a VM is powered, the memory mapping is lost. Therefore, upon mounting, FLR agents cannot detect the existence of a VHD disks as the disks will not be mapped. So, any file in the VHD drives cannot be recovered using file level recovery. Process 117 of system 100 overcomes these shortcomings to facilitate FLR with VHD disks.

In general, virtual machine environments utilize hypervisors (e.g., Hyper-V) to create and run the virtual machines. A computer running the hypervisor is a host machine and all virtual machines are guest machines running guest operating systems (OS). The hypervisor provides the guest operating systems with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest operating systems, typically by using an API.

In an embodiment, system 100 represents a backup platform (e.g., EMC Networker) that supports backups of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created.

In present data backup and recovery systems, an FLR operation comprises four typical steps. These are: first, initiating a backup operation of a VM; second, mounting the source backup copy on the destination VM and installing an FLR agent in the destination VM; third, using the FLR agent to browse through the source VM file system through the mount points of the second step; and fourth, selecting the files needed to recover to the destination location and copying these files to the destination VM folder.

In present systems, this current method has significant limitations. For example, certain backup systems do not take memory snapshots. In this case, the backup would not maintain the memory mapped to the VHD drives. So, in any backup operation, the VHD mapping is lost while taking a backup. Hence any recovery operations on this VM would not have the VHD disk mapping. Furthermore, the FLR agents can only show the file system, but do not themselves have any intelligence to itself to perform any activity on the destination VM to locate the VHD disks in the source VM.

Figure 3:
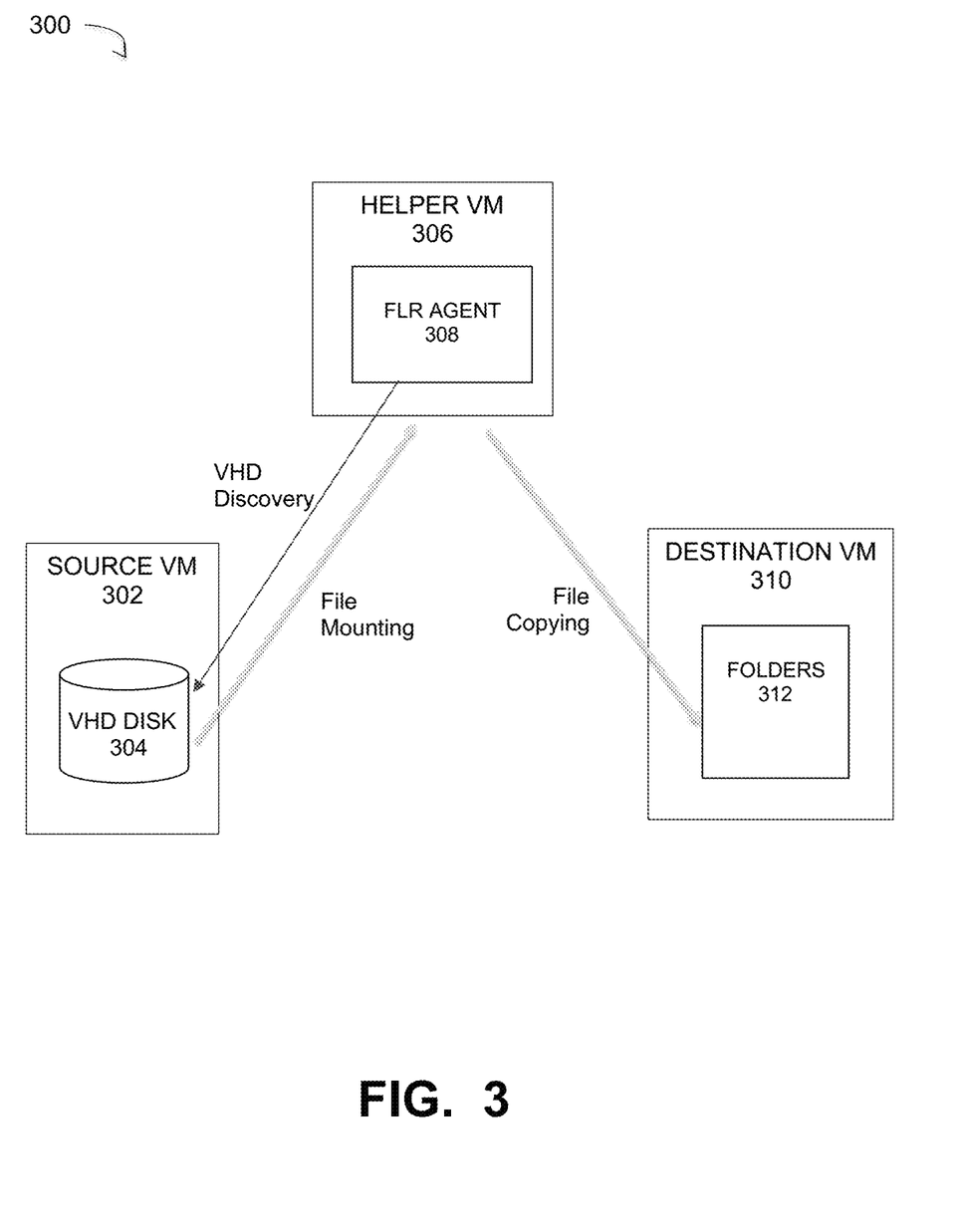
FIG. 3 is a block diagram that illustrates functional components of a file level restore process for VHD disks, under some embodiments.

As stated previously, the backups typically do not maintain the VHD disk mapping while taking the backup. Embodiments of process 217 provide some intelligence to an FLR agent so that the backup system can discover the VHD disks in the source VM (backed up copy) VM. FIG. 3 is a block diagram that illustrates functional components of a FLR process for VHD disks, under some embodiments. As shown in diagram 300 of FIG. 3, a source VM has at least one VHD 304 that holds files or data to be restored in a file level recovery operation. These files are to be written to folders 312 of a destination VM. A helper VM 306 is created with an FLR agent 308 to provide the means to facilitate the FLR process for VHD disk 304 and maintain the VHD mapping that would otherwise be lost in normal FLR operations. The components of FIG. 3 will be discussed in conjunction with the method illustrated in FIG. 4.

Figure 4:
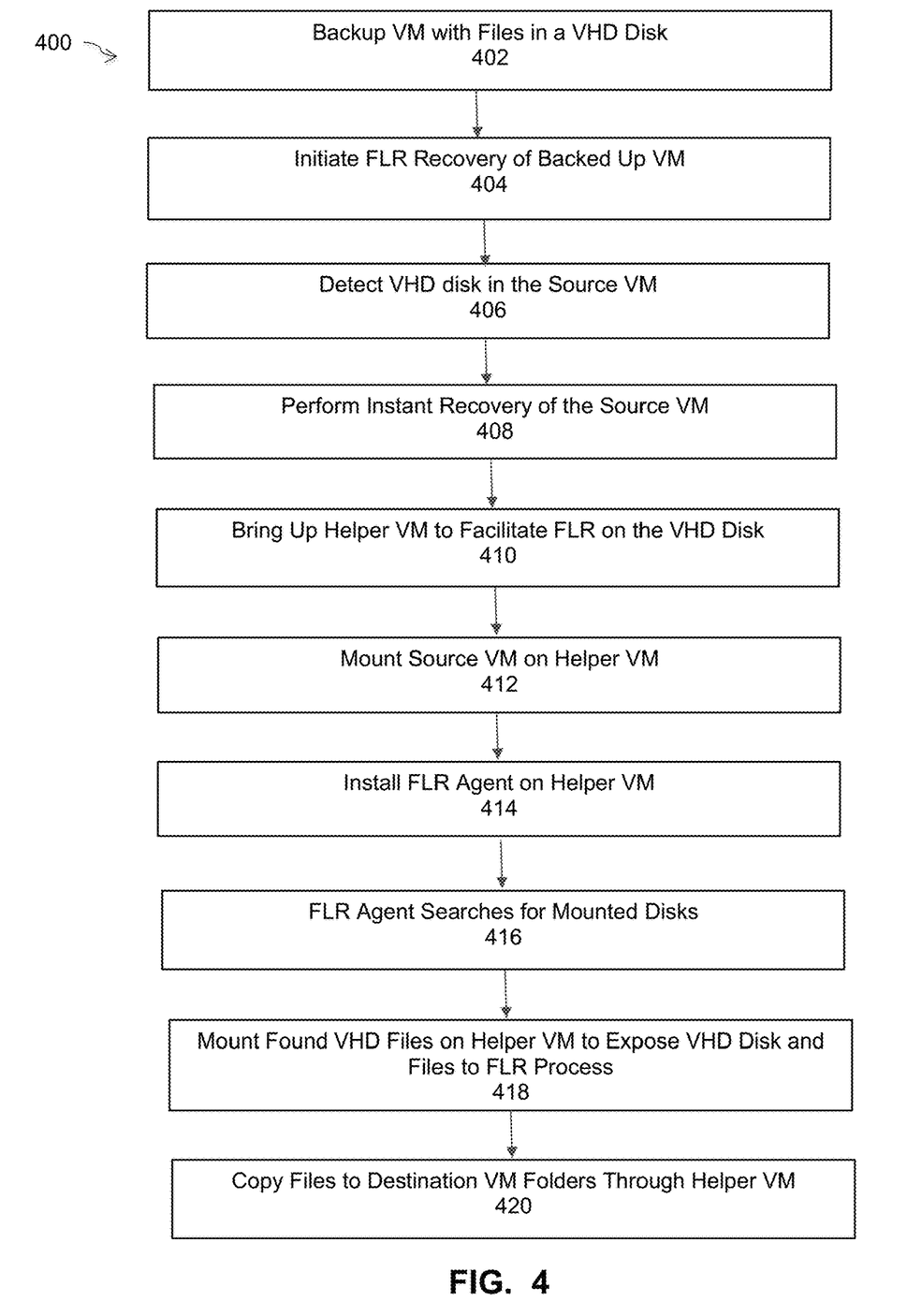
FIG. 4 is a flowchart illustrating a method of performing file level recovery for VHD disk files, under some embodiments.

FIG. 4 is a flowchart that illustrates a method of performing file level recovery for VHD disks, under some embodiments. The process 400 of FIG. 4 begins with the backing up of files in a VHD disk using normal backup system procedures, 402. In step 404, a file level recovery operation is initiated from the backed up VM, denoted the "source VM." This process detects the presence of the VHD disk in the source VM, 406. Upon detection of a VHD disk or dynamic disks on the source VM, the process performs an Instant Recover (IR) operation of the source VM, 408. In step 410, a helper VM is launched or initiated to facilitate the FLR operation on the VHD disk. The process then mounts the source VM disk on the helper VM, 412.

As shown in FIG. 3, the FLR agent 308 is installed on the helper VM, 306, as performed in step 414 of process 400. The installed FLR agent searches for the mounted disks (.VHD disks) in the VM, 416. The found VHD files are then mounted on the helper VM using its internal memory, 418. Upon successful mounting, the VHD disks will be made visible for FLR recovery and the files within it will be exposed to be recovered. These files can then be copied to any destination VM folders through the helper VM, 420.

Thus, with respect to FIG. 3, process 400 functions to install the smart FLR agent 308 in helper VM 306. This agent discovers the VHD disk or disks 304 in the source VM 302. Files in the VHD disk 304 are then mounted to the internal memory of the helper VM 306 for eventual copying to folders 312 in the destination VM 310 during the FLR operation. In an embodiment, FLR agents are installed on the destination VM. The logic of such agents is enhanced to allow them to detect the VHD or dynamic disks after the FLR agent is installed. This enhanced logic provides a way for the system to actually detect these disk types.

Figure 5:
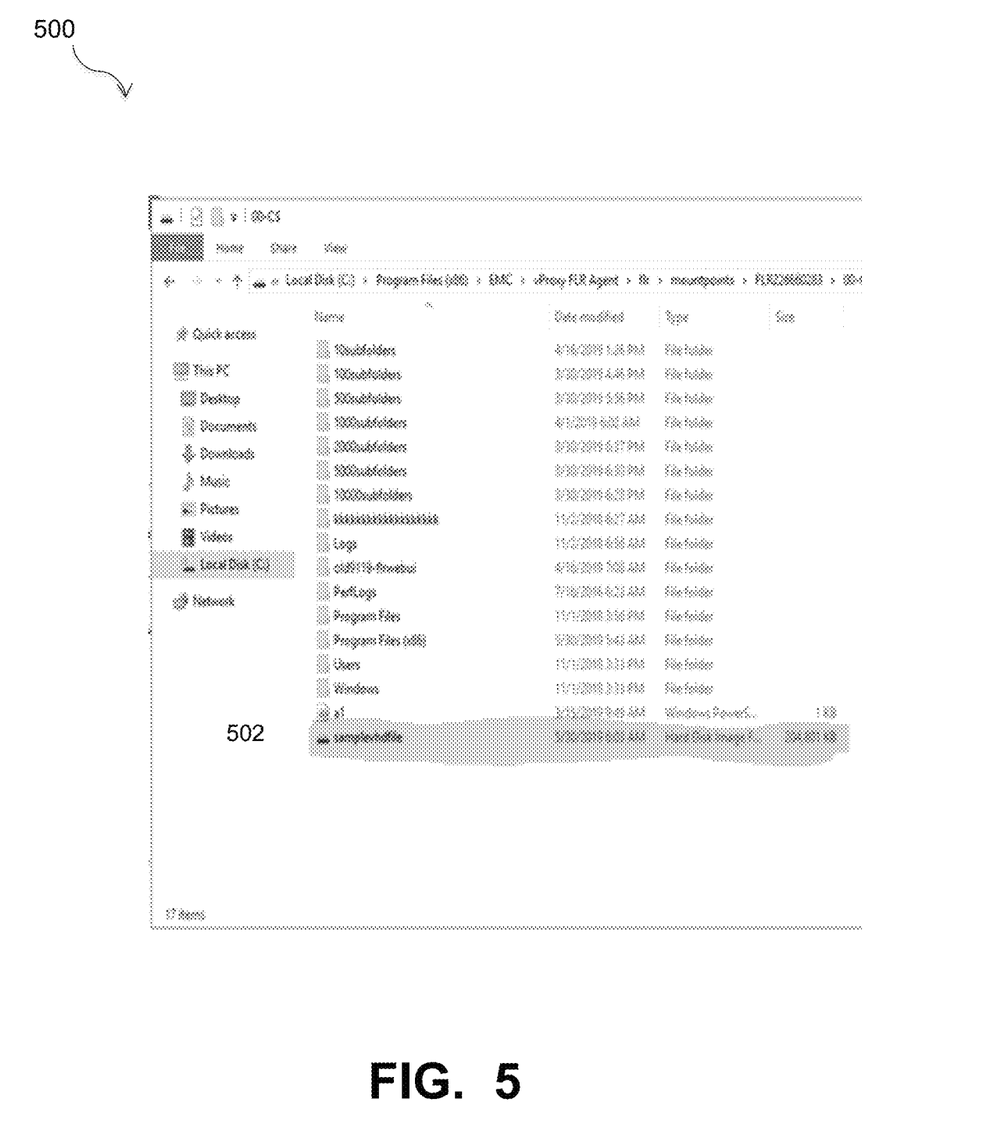
FIG. 5 illustrates an example UI display showing a discovered VHD disk in a source VM, under some embodiments.

As shown in FIG. 2, components of the VHD disk FLR system 200 include a FLR UI component 208. FIG. 5 illustrates an example UI display 500 showing a discovered VHD disk in a source VM, under some embodiments. This example shows a search of Local Disk (C:) and the presence of a highlighted file name 502 labeled "samplevhdfile" as being a hard disk image comprising a VHD disk. As described above, when the FLR operation is initiated, an agent is pushed to the destination VM. The enhanced detection logic of this agent identifies the appropriate suffix or naming convention of these disks, such as the ".vhd" nomenclature from the attached disks. The identification of these disks will be on the attached disks, that is, the source VMs disks.

File Level Recovery for Dynamic Disks

As stated previously, present systems do not support FLR on dynamic disks due to the fact that they do not have the capability to map the disks with same UUID for SCSI disks in case of dynamic disks. In general, a source VM with a dynamic disk cannot be mounted on a VM with simple disks or a VM with dynamic disks (destination VM). That is, the VM with dynamic disks cannot be mounted on the destination VM directly because an iSCSI disk and an original disk on the server have the same UUID and thus the iSCSI disk cannot be brought online or will be marked as invalid during an FLR operation However, embodiments of the FLR process for dynamic disks 217 uses the fact that a source VM with simple disks can be mounted on a VM with dynamic disks (destination VM).

Figure 6:
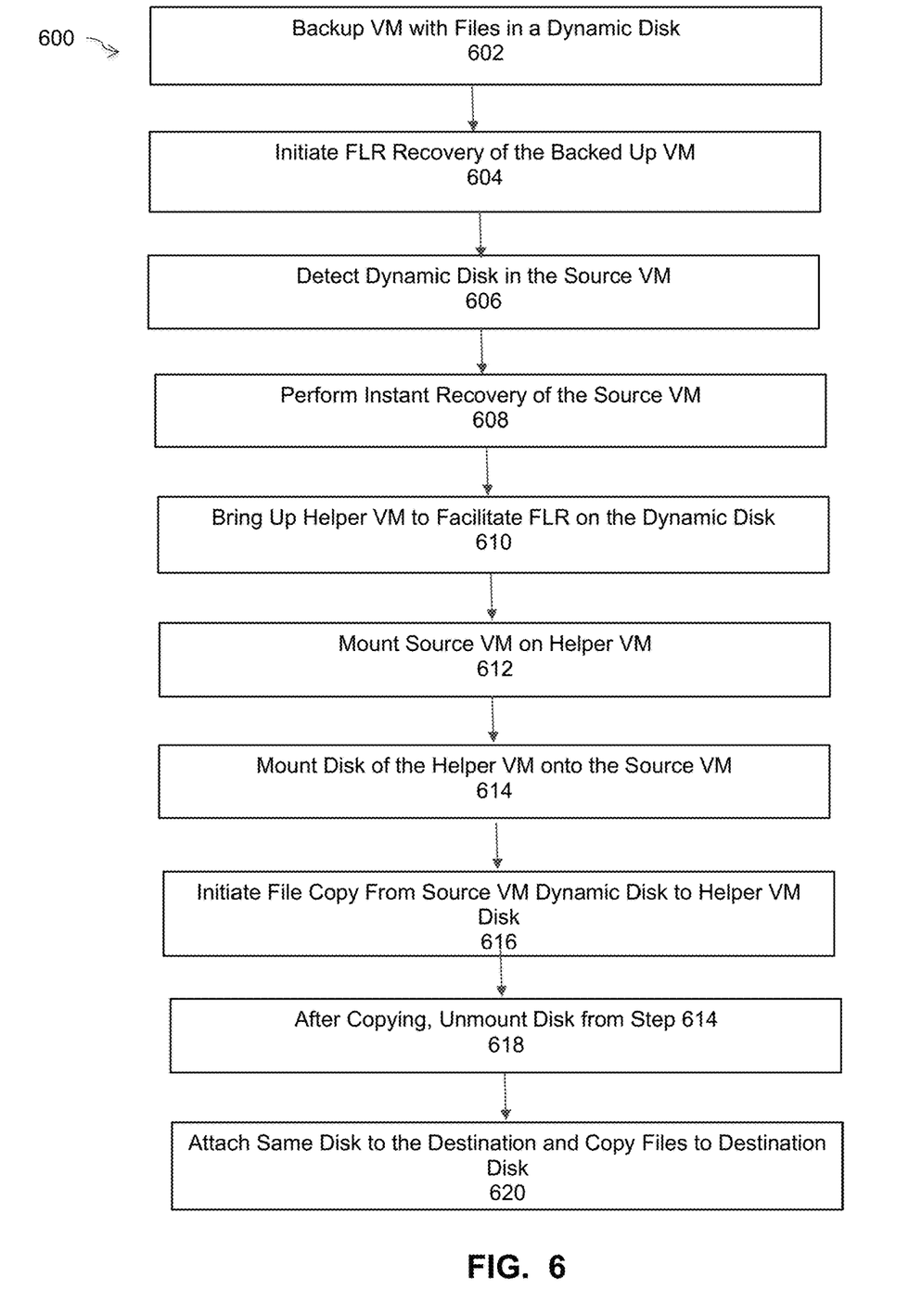
FIG. 6 is a flowchart that illustrates a method of performing file level recovery for dynamic disks, under some embodiments.

FIG. 6 is a flowchart that illustrates a method of performing file level recovery for dynamic disks, under some embodiments. In step 602, a VM with files in a VM with dynamic disks attached to it is backed up using normal backup system procedures. In step 604, a file level recovery operation is initiated from the backed up VM, denoted the "source VM." This process detects the presence of the dynamic disk in the source VM, 606. Upon detection of a VHD disk or dynamic disks on the source VM, the process performs an instant recovery (IR) of the source VM, 608. In step 610, a helper VM is launched or initiated to facilitate the FLR operation on the dynamic disk. The process then mounts the source VM disk on the helper VM, 612.

The process next mounts the disk of the helper VM from step 610 onto the source VM, 614. Mounting simple disks on to the VM with dynamic disks is supported. The process then initiates the file copy from source VM with the dynamic disk to the attached disk of the helper VM, 616. In general, none of these operations would affect the source VM data or the destination VM data as the source VM is an instant restore (IR) replica of the backup copy. In step 618, after copying the files to the attached disk, the process unmounts the disk mounted in step 614. The process then attaches the same disk to the destination VM where the actual recovery is needed, and once the mount is successful, the files are copied to the destination folder, 620.

Figure 7:
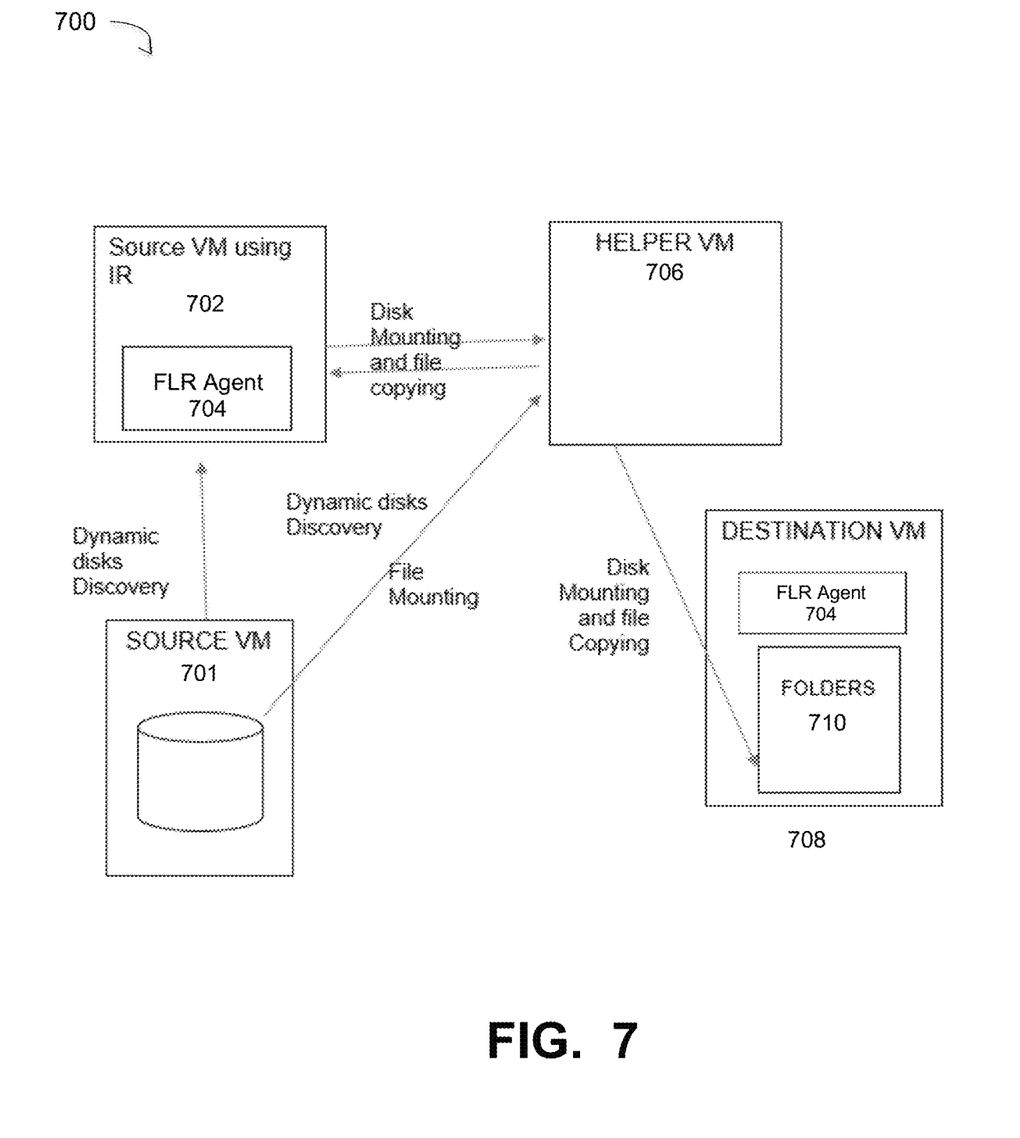
FIG. 7 is a block diagram that illustrates functional components of a file level recovery process for dynamic disks, under some embodiments.

FIG. 7 is a block diagram that illustrates functional components of a FLR process for dynamic disks, under some embodiments. As shown in diagram 700 of FIG. 7, a source VM 701 spawns a source VM 702 using an Instant Recovery (IR) process. This VM 702 has an installed FLR agent 704, that has enhanced logic to identify appropriate identifiers or nomenclature of dynamic disks (e.g., iSCSI disks). In an embodiment, this might be the same agent 308 that is installed in helper VM 306 of system 300 (FIG. 3), or it may be a different FLR agent. The IR process of VM 702 is used to attached helper VM 706, which mounts its disks on the spawned source VM 702. The helper VM then performs disk mounting and file copying operations on destination VM 710 to access folders 710. This destination VM also has installed on it FLR agent 704.

The components and functional operations among them will be discussed in conjunction with the method illustrated in FIG. 8 below.

In an embodiment, the data exchange can be internally handled by backup server 102 generally as follows:
  1) Spawning the source VM using Instant Recovery (IR) technology.
  2) Spawning a helper VM.
  3) Attaching the helper VM disks to the source VM spawned using IR technology.
  4) Performing mount operation.
  5) Initiating the copy between the disks.
  6) Performing unmounting operation.
  7) Again mounting the helper VM disk on to the Destination VM to make the copy to the required folder.

Figure 8:
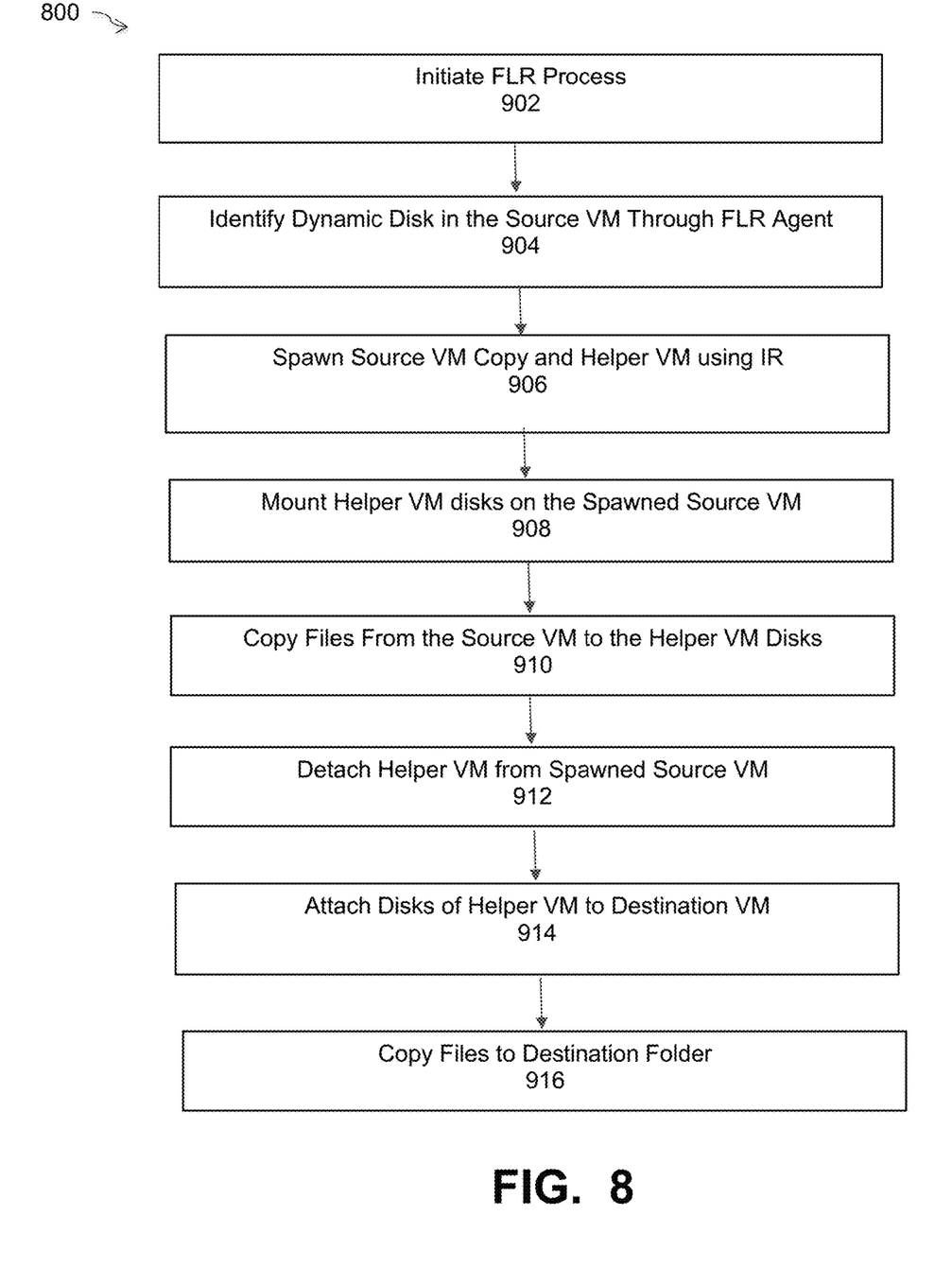
FIG. 8 is a flowchart that illustrates a method of data exchange by a backup server performing file level recovery for dynamic disks, under some embodiments.

FIG. 8 is a flowchart that illustrates a method of data exchange by a backup server performing file level recovery for dynamic disks, under some embodiments. The process 800 of FIG. 8 begins with initiating the FLR operation, 902. This FLR operation identifies the existence of a dynamic disk on the source VM through an installed FLR agent that is configured to identify appropriate identifiers or nomenclature of dynamic disks, 904. Upon detecting the dynamic disks, a copy of the source VM 701 and a helper VM 706 are spawned using the IR technology of source VM 702, step 906. In step 908, the process helper VM 706 mounts its disks on the spawned source VM 702. The files are copied from the source VM folders to the disks of the helper VM, step 910. Once this copy operation is complete, the helper VM 706 detaches itself from the spawned source VM 702, step 912. Then, the same disks of the helper VM are attached to the destination VM 708, step 914, and the files are copied to the destination folder 710, step 916.

In this process 800, the helper VM 706 is used as messenger or a file transfer facilitator between the source VM 701 and the destination VM 708. The FLR agent 704 is installed on both source 701 and destination 708 VMs, as the source VM with IR, 702, and the destination VM 708 would need to expose the helper VMs 706 disks through the mount operation.

In some embodiments, FLR process 117 can operate with VMs or proxy VMs (vProxy). In general, the vProxy or proxy VM is different from base VM. The vProxy is the VM on which restore processes runs, and the base VM is where the backup gets mounted (as done by vProxy) for read operations. In an embodiment, the proxy VM (vProxy) comprises a minimum resource VM defined by a template and contains an OS boot disk and subsequent disks that are backups mounted by the process 117. The Proxy VM can be configured as required. The Proxy VM can be accessed through appropriate UI tools and search functions.

Although embodiments have been described with respect to network backup comprising certain specific technologies, such as Hyper-V servers, and certain backup agents or processes, it should be noted that embodiments are not limited, and that other backup systems and methods may also utilize the methods described herein.

As described above, in an embodiment, system 100 FLR processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 9:
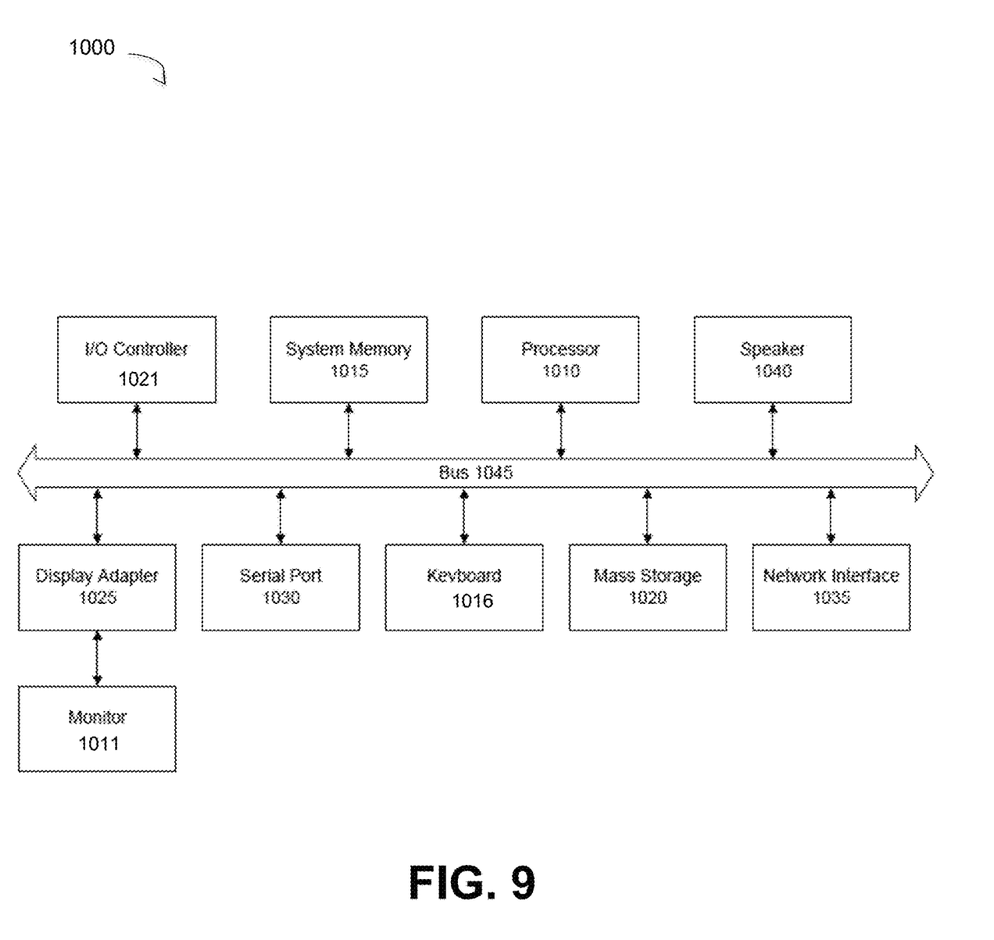
FIG. 9 is a block diagram of a computer system used to execute one or more software components of a system for performing file level recovery of virtual and dynamic disks, under some embodiments.

FIG. 9 is a block diagram of a computer system used to execute one or more software components of a system for VHD and dynamic disk file level recovery, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 9 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing file level recovery (FLR) operations on a dynamic disk after a data backup of files to a source virtual machine (VM) for copying to a destination VM, comprising:
    initiating an FLR operation from the source VM and detecting the presence of the dynamic disk in the source VM;
    spawning, upon detection of the dynamic disk on the source VM, a copy of the source VM executing an Instant Recover (IR) operation;
    launching a helper VM using the IR operation of the source VM copy;
    mounting helper VM disks on the source VM copy by first copying files from the source VM to the helper VM disks;
    detaching, upon completion of the first copying, the helper VM from the source VM copy;
    attaching the helper VM to the destination VM; and
    second copying the files to the destination VM.

2. The method of claim 1 further comprising installing an FLR agent on both the source VM copy and the destination VM.

3. The method of claim 2, wherein detection of the dynamic disk is performed by an FLR agent identifying a name element designating a disk in the source VM as a dynamic disk type.

4. The method of claim 3 wherein the dynamic disk comprises an iSCSI disk using an Internet Protocol (IP) based networking standard for linking data storage facilities.

5. The method of claim 4 wherein the helper VM acts as a file transfer facilitator between the source VM and the destination VM, and wherein the mounting exposes the helper VM disks to the destination VM.

6. The method of claim 3 wherein the data backup comprises a block-based backup of volumes and files, and wherein the data backup is performed by a backup server in a Networker backup platform and the source VM is implemented using a VMware-based hypervisor.

7. The method of claim 6 wherein the FLR operation uses a NFS (network file system) data store mount on the VMware-based hypervisor, and wherein the IR operation comprises a Networker process that exports the backup files as an NFS file share using FLR mount operations.

8. The method of claim 7 wherein the backup files are stored using a VMDK (Virtual Machine Disk) file format that describes containers for virtual hard disk drives used in VMs managed by the hypervisor.

9. A computer-implemented method of distinguishing a regular source disk from a dynamic disk within a source virtual machine (VM) during a File Level Recovery (FLR) operation, comprising:
    copying the source VM to spawn a source VM copy having an instant recover (IR) process;
    detecting of the dynamic disk in the source VM using a FLR agent installed in the source VM copy, wherein the FLR agent is configured to recognize a disk name indicating the disk to be a dynamic disk;
    launching a helper VM using the IR process of the source VM copy, the helper VM acting as a file transfer facilitator between the source VM and a destination VM;

installing the FLR agent on the destination VM:
first copying files from the source VM to disks of the helper VM;
attaching the disks of the helper VM to the destination VM; and
second copying the files from the disks of the helper VM to destination folders on the destination VM.

10. The method of claim 9 wherein a data backup comprises a block-based backup of volumes and files on the dynamic disk, and wherein the data backup is performed by a backup server in a Networker backup platform and the source VM is implemented using a VMware-based hypervisor.

11. The method of claim 10 wherein the dynamic disk comprises an iSCSI disk using an Internet Protocol (IP) based networking standard for linking data storage facilities.

12. The method of claim 11 wherein the FLR operation uses a NFS (network file system) data store mount on the VMware-based hypervisor, and wherein the IR operation comprises a Networker process that exports the backup files as an NFS file share using FLR mount operations.

13. The method of claim 12 wherein the backup files are stored using a VMDK (Virtual Machine Disk) file format that describes containers for virtual hard disk drives used in VMs managed by the hypervisor.

14. A system for performing file level recovery (FLR) operations on a dynamic disk, comprising:
a source virtual machine (VM) storing data files after a data backup operation and to be restored using the FLR operations;
a source VM copy spawned from the source VM and having an Instant Recover (IR) execution component performing IR operations;
a destination VM functionally coupled to the source VM to hold recovered files from the source VM;
a helper VM functionally coupled to the source VM and the destination VM; and
a FLR agent installed on each of the source VM copy and the destination VM and configured to identify a disk on the source VM as being a dynamic disk, and to allow the helper VM to act as a file transfer facilitator between the source VM and the destination VM.

15. The system of claim 14 wherein the FLR agent is configured to automatically distinguish the dynamic disk from a regular source disk within a source virtual machine (VM) during a File Level Recover (FLR) operation, and wherein the FLR agent identifies a name element designating the dynamic disk in the source VM as a dynamic disk type.

16. The system of claim 14 wherein the helper VM is spawned by the IR execution component of the source VM copy.

17. The system of claim 16 wherein a data backup comprises a block-based backup of volumes and files in the VHD format, and wherein the data backup is performed by a backup server in a Networker backup platform and the source VM is implemented using a VMware-based hypervisor.

18. The system of claim 17 wherein the dynamic disk comprises an iSCSI disk using an Internet Protocol (IP) based networking standard for linking data storage facilities.

19. The system of claim 18 wherein the FLR operation uses a NFS (network file system) data store mount on the VMware-based hypervisor, and wherein the IR operation comprises a Networker process that exports the backup files as an NFS file share using FLR mount operations.

20. The system of claim 19 wherein the backup files are stored using a VMDK (Virtual Machine Disk) file format that describes containers for virtual hard disk drives used in VMs managed by the VMware-based hypervisor.

* * * * *